United States Patent [19]

Tsutsumi et al.

[11] Patent Number: 4,670,361
[45] Date of Patent: Jun. 2, 1987

[54] MANIFOLD DEVICE FOR FUEL CELL SYSTEM

[75] Inventors: Masaru Tsutsumi, Hyogo; Hideo Hagino, Otsu; Osamu Fujiwara, Kobe, all of Japan

[73] Assignee: Sanyo Electric Co., Ltd., Osaka, Japan

[21] Appl. No.: 875,907

[22] Filed: Jun. 19, 1986

[30] Foreign Application Priority Data

Jun. 20, 1985 [JP] Japan ................. 60-134731

[51] Int. Cl.$^4$ .................. H01M 2/00; F15D 1/00
[52] U.S. Cl. .......................... 429/34; 429/39; 165/158; 138/37
[58] Field of Search ................. 429/34–39; 165/158; 138/26, 37, 38

[56] References Cited

U.S. PATENT DOCUMENTS

| | | | |
|---|---|---|---|
| 4,233,146 | 11/1980 | Rothmayer et al. | 429/39 X |
| 4,365,007 | 12/1982 | Maru et al. | 429/34 X |
| 4,510,213 | 4/1985 | Schnacke | 429/36 |

FOREIGN PATENT DOCUMENTS 2309991 11/1976 France .................. 429/39

*Primary Examiner*—Brian E. Hearn
*Assistant Examiner*—Stephen J. Kalafut
*Attorney, Agent, or Firm*—Armstrong, Nikaido, Marmelstein & Kubovcik

[57] ABSTRACT

A manifold device for a fuel cell system comprises a body shell having at least one opening, a closure plate having a protrusive portion and being mounted on the shell to form a manifold box, and a distribution unit arranged in the shell to partition an interior space of the shell into the first and second chambers. The unit comprises a pair of partitioning members and a partitioning plate mounted thereon in a spaced relationship to form slit-like gaps between them. The protrusive portion of the closure plate is provided with slit-like blowholes to supply process gas to a fuel cell stack. The partitioning plate is provided with a distributor and a deflector. The distributor is positioned in front of the opening so as to divide the gas flow from the opening into an upward flow and a downward flow, while the deflector is mounted on the exterior surface of partitioning plate and extends vertically in parallel to a center line of the protrusive portion to allow the process gas to converge to the protrusive portion of the closure plate.

3 Claims, 8 Drawing Figures

MANIFOLD DEVICE FOR FUEL CELL SYSTEM

FIELD OF THE INVENTION

This invention relates to a manifold device for a fuel cell system and, more particularly, to a manifold device for supplying a process gas to a fuel cell system.

DESCRIPTION OF THE PRIOR ART

In order to allow a fuel cell system to fulfil its function most effectively, manifold devices are required to have the function to uniformly supply process gases to the whole process gas channels of a fuel cell stack. To this end manifold devices of the prior art are provided with various distributors such as, for example, those shown in FIGS. 6 to 8. In a fuel cell system of FIG. 6, an inlet manifold device 31 is provided with plural distribution plates 32 which are spaced equidistantly away from one another. In another fuel cell system of FIGS. 7 and 8, an inlet manifold device 33 is provided with one or more diffusion pipes 34 each having a plurality of perforations 35, through which the process gas enters the interior of the manifold and then flows into the fuel cell stack 1.

In the former construction, however, the greater the height of the fuel cell stack, the greater the number of spaced distributor plates, resulting in increase in size of the manifold device. Also, this makes it difficult to uniformly distribute the process gas to the whole process gas channels of the stack. In the latter construction, it is difficult to uniformly distribute the process gas to the whole process gas channels of the stack without increase in pressure loss which occurs in the diffusion pipe. The common disadvantage of these manifold devices is that the process gas distribution can not be made uniform when there is a fluctuation in a flow rate of the process gas supplied to the manifold. Particularly, this becomes a serious problem when the flow rate of the process gas is small.

In addition, the construction of these devices can not be applied to a pressurized fuel cell system wherein the process gases are supplied to the fuel cell stack under a high pressure of about 5 to 7 atmospheric pressure, since the distribution of the process gas becomes ununiform considerably.

SUMMARY OF THE INVENTION

It is therefore an object of the present invention to provide a manifold device which is low in pressure loss and makes it possible to uniformly supply process gas to the fuel cell stack regardless of fluctuation in a flow rate of process gas fed to the manifold device.

Another object of the present invention is to provide a manifold device suitable for a pressurized fuel cell system.

According to the present invention there is provided a manifold device for a fuel cell system, comprising a body shell having at least one process gas inlet opening, a closure plate having a perforated protrusive portion and being mounted on the shell to form a manifold box, and a distribution unit arranged in the shell to partition an interior space of the shell into the first and second chambers, said protrusive portion of the closure plate being provided with slit-like blowholes to supply process gas to a fuel cell stack, said distribution unit comprising a pair of partitioning members and a partitioning plate mounted thereon in a spaced relationship to form slitlike gaps between them, the first chamber being connected to a process gas inlet pipe through said opening, the second chamber being connected to the first chamber through the slit-like gaps, said partitioning plate being provided with a distributor and a deflector, said distributor having a mountain-shaped cross section and being positioned in front of the opening so as to divide the gas flow from the opening into an upward flow and an downward flow, said deflector being mounted on the exterior surface of partitioning plate and extending vertically in parallel to a center line of the protrusive portion to allow the process gas to converge to the protrusive portion of the closure plate.

PREFERRED EMBODIMENT OF THE INVENTION

Figure 1:
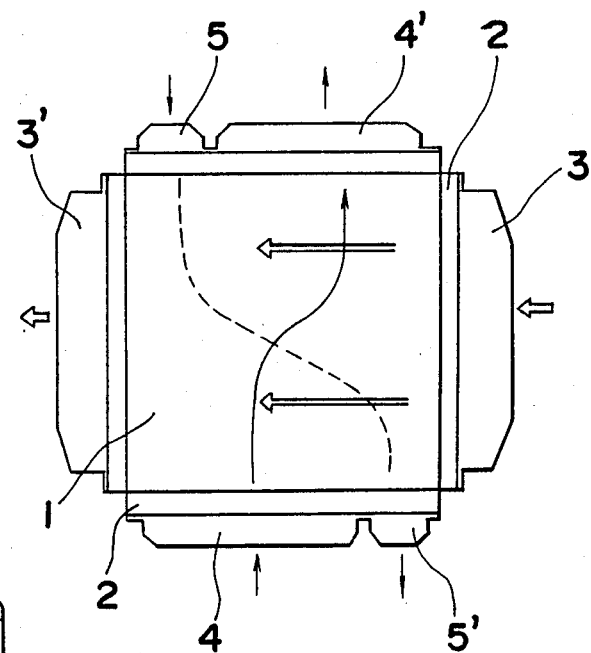
FIG. 1 is a schematic plane view of a fuel cell system with manifold devices embodying the present invention.
Figure 2:
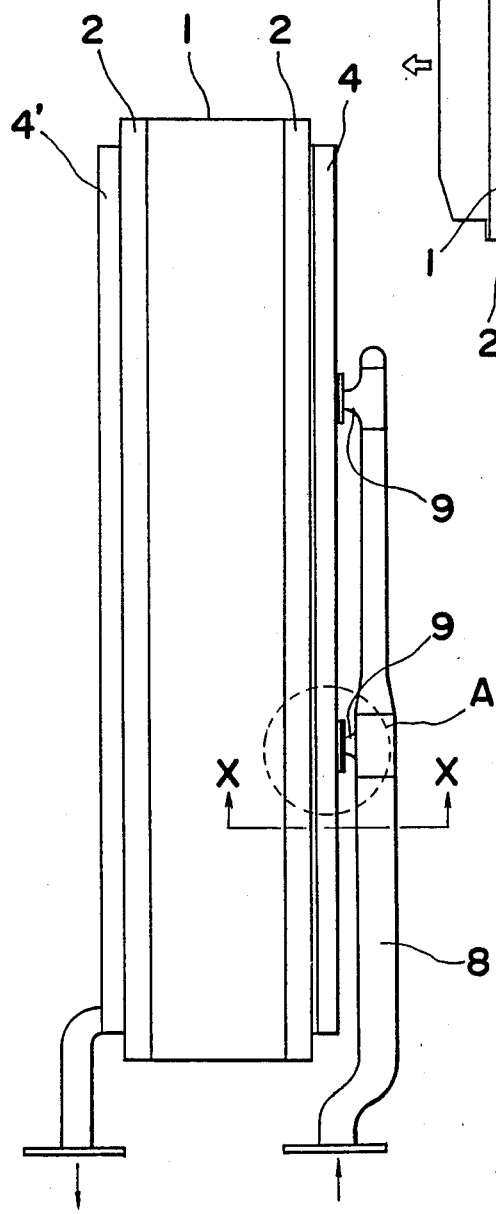
FIG. 2 is a schematic side view of the fuel cell system of FIG. 1, with fuel gas inlet manifold being removed.

Referring now to FIG. 1, there is shown a fuel cell system with manifold device embodying the present invention, comprising a fuel cell stack 1 surrounded by rigid frames 2 which are tightly fastened by connecting means (not shown). Mounted on the rigid frames 2 are inlet and outlet manifold devices 3, 3' for cooling gas, inlet and outlet manifold devices 4, 4' for oxidizing gas such as process air, and inlet and outlet manifold devices 5, 5' for fuel gas. The cooling gas is supplied to the stack 1 through the inlet manifold 3 and discharged throught the outlet manifold 3'. The process air and fuel gas are respectively supplied to the fuel cell stack 1 through the inlet manifolds 4 and 5, and then discharged from the stack 1 through the outlet manifolds 4' and 5'. The fuel cell stack 1 comprises a plurality of individual fuel cells and a plurality of bipolar plates 19, which are alternately stacked as shown in FIG. 4.

Figure 3:
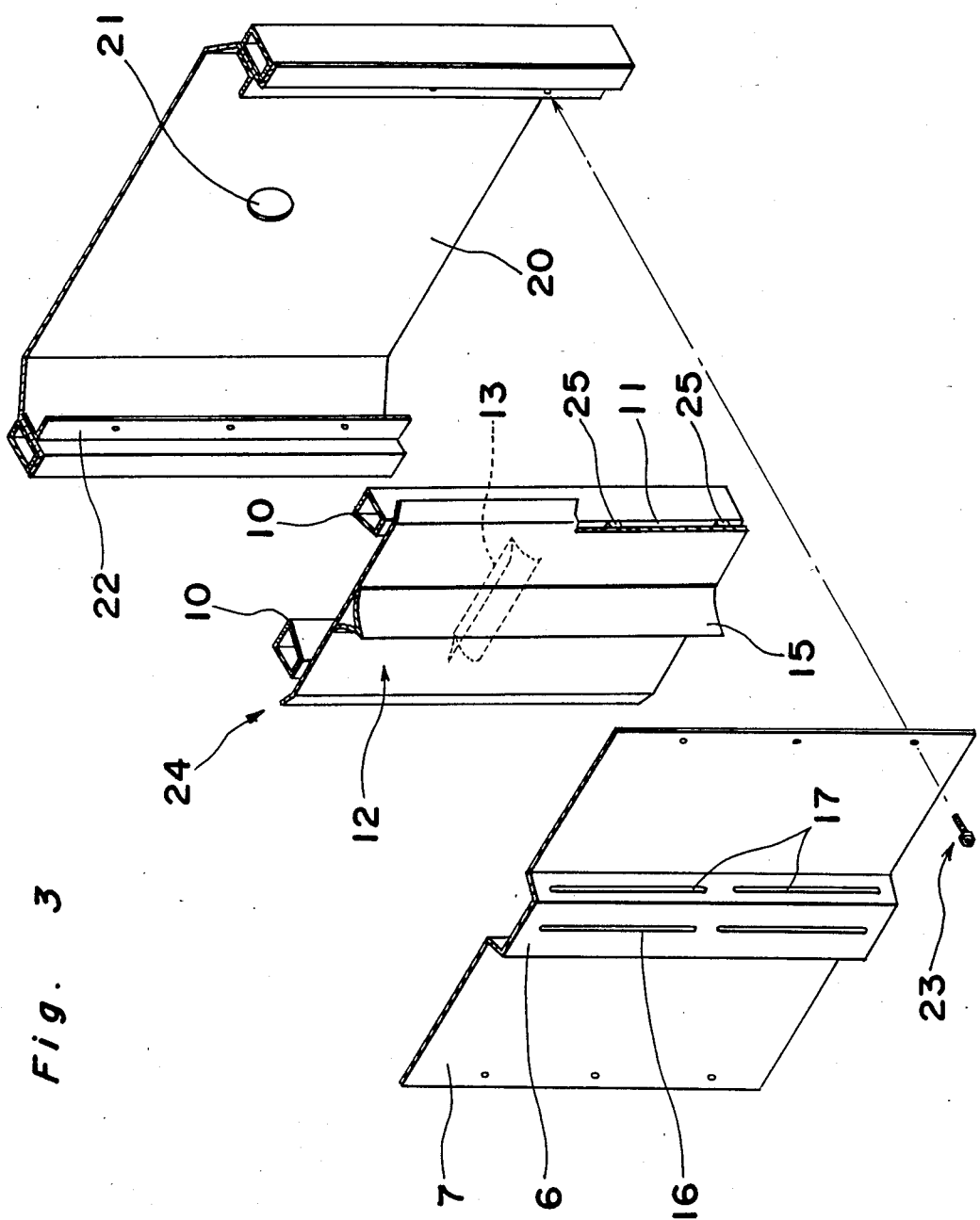
FIG. 3 is an exploded perspective view showing a part of the manifold device employed in the fuel cell system of FIG. 1.
Figure 4:
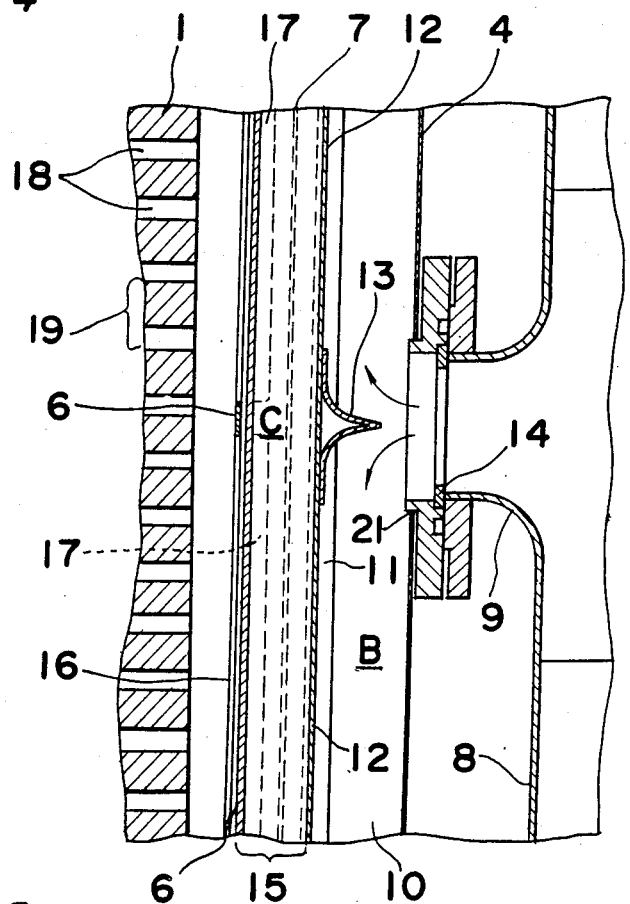
FIG. 4 is an enlarged section view of a part indicated by a symbol A in FIG. 2.
Figure 5:
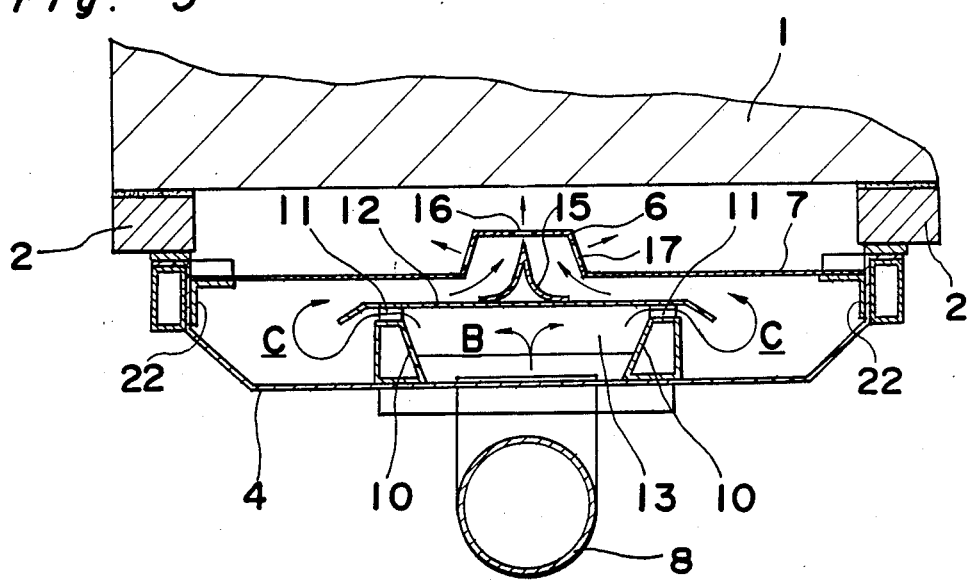
FIG. 5 is a section view of the fuel cell system taken along a line X—X of FIG. 2.
Figure 6:
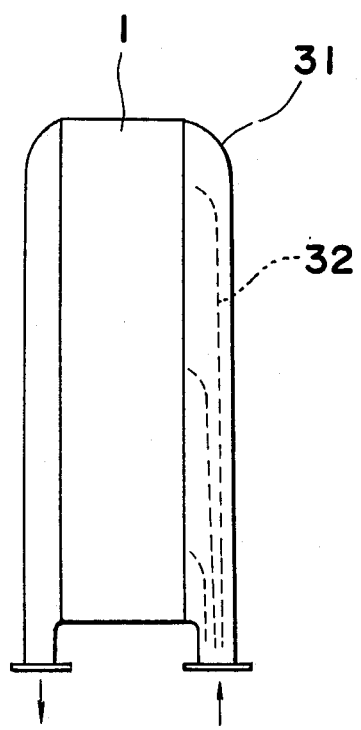
FIG. 6 is a schematic side view of a fuel cell system of the prior art.
Figure 7:
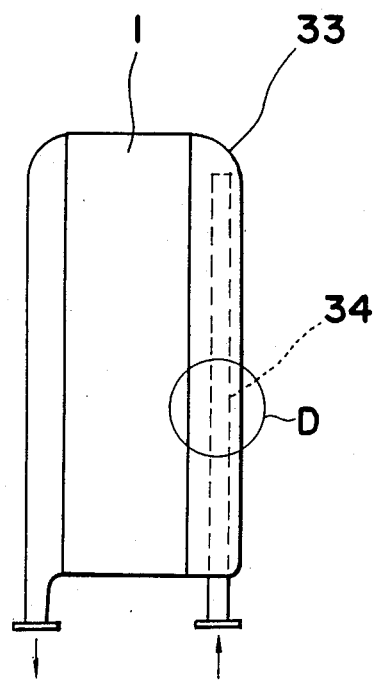
FIG. 7 is a view similar to FIG. 6 showing another form of a fuel cell system of the prior art.
Figure 8:
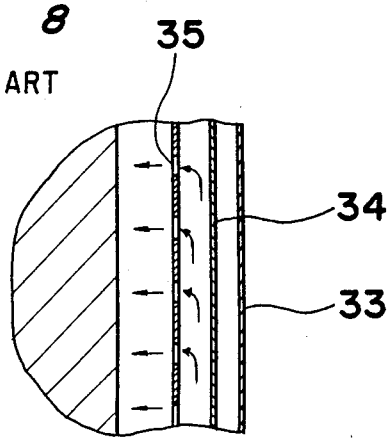
FIG. 8 is an enlarged section view of a part indicated by a symbol D in FIG. 7.

The construction of the manifold device 4 is shown in detail in FIGS. 3 to 5. The manifold device 4 comprises a body shell 20 having openings 21 and being provided with angle members 22, to which a closure plate 7 is fixed by screws 23. The number of openings 21 may vary with height of the fuel cell stack 1. The closure plate 7 is attached to the shell 20 to form a manifold box, or, a generally flat rectangular box-like construction having side walls, a top and a bottom. Arranged in an interior space formed between the shell 20 and the closure plate 7 is a distribution unit 24, which divide the interior space into two chambers, i.e., the first diffusion chamber B and the second diffusion chamber C, as is best seen in FIG. 5.

The closure plate 7 is coextensive in length with the shell 20 and is provided at its central portion with a protrusive portion 6, which has a trapezoid shaped cross section and extends vertically in the stacked direction of fuel cell stack components. The vertically extending protrusive portion 6 is provided at its top and side walls with slit-like blowholes 16 and 17 to uniformly supply the process air to all the process air channels 18 provided in the bipolar plates 19.

The distribution unit 24 comprises a pair of partitioning members 10 and a partitioning plate 12 mounted on the partitioning members 10 in a spaced relationship so as to permit gas flow from the first chamber B to the second chamber C. Arranged between the partitioning members 10 and the partitioning plate 12 are spacers 25 which form slit-like gaps 11 between them. The partitioning members 10 extend vertically inside the shell 20 in a parallel relationship with one another. The members 10, together with the partitioning plate 12, form the first diffusion chamber B having a cross section in the shape of an unfolded fan, as shown in FIG. 5.

The partitioning plate 12 is slightly bent at its both sides in the direction facing to the shell 20. The partitioning plate 12 is provided with a distributor 13 and a deflector 15, both of which have a mountain-shaped cross section. The distributor 13 extends laterally between the partitioning members 10 and is positioned in front of the opening 21 so as to divide the gas flow from the inlet pipe 9 into two flows, i.e., upward flow and downward flow, as shown in FIG. 4. The deflector 15 is mounted on the exterior surface of partitioning plate 12 and extends vertically in parallel to a center line of the protrusive portion 6 to allow gas to converge to the protrusive portion 6 of the closure plate 7.

The openings 21 of the shell are fitted with inlet pipes 9, which are connected at the other end to a supply pipe 8. Each inlet pipe 9 is provided at its outlet with an adjustable orifice 14 in order to adjust the flow rate of the process gas and/or the ratio of the upward flow rate to the downward flow rate.

The manifold device 4 having the above construction is generally mounted on the frame 2, leaving a clearance of about 20 to 30 mm between the side of the fuel cell stack 1 and the top of the protrusive portions 6.

In operation, an oxidizing gas such as, for example, process air is supplied to the manifold device 4 through the inlet pipe 9 connected to the supply pipe 8. The process air flows into the first diffusion chamber B, where the gas flow is divided into the upward and downward flows by the deflector 13. The process air then diffuses in the first chamber B and enters into the second diffusion chamber C through the slit-like gaps 11, as shown FIGS. 4 and 5. In the second chamber C, the gas flow reverses in direction and is forced towards the protrusive portion 6 by the side walls of the shell 21 and the deflector 15, so that the process air converges to the protrusive portion 6 and then flows into the fuel cell stack 1 through the slit-like blowholes 16 and 17. As is evident from the FIG. 5, the process air from the central blowholes 16 diffuses transversely to some extent and enters the process air channels 18 arranged longitudinally at the central portion of the side of the fuel cell stack 1, whereas the process air from the side blowholes 17 enters the process air channels 18 arranged longitudinally on both sides of the central portion. At the downstream end of the system, the process gases pass from the process gas channels 18 into the outlet manifold 4' and thence outwardly through the outlet pipe.

As will be seen from the above, the process air separates into upward and downward directions in the first diffusion chamber, and then enters through the slit-like gaps into the second diffusion chamber where the gas flow reverses in direction and is forced toward the protrusive portion of the closure plate. Accordingly, the process air flows out smoothly through the manifold device without occurrence of a turbulent flow, thus making it possible to reduce the pressure loss in the manifold device. Also, the diffusion chambers make the pressure of the gas uniform, thus making it possible to supply the process air uniformly to the whole process gas channels of the fuel cell stack even if there is fluctuation in the flow rate of process air fed to the manifold device. Accordingly, the manifold device is suitable as a process air supply manifold device for a pressurized fuel cell system with a large side area.

In the above embodiment, the invention has been explained on the manifold device for supplying process air to the fuel cell stack, but it may be applied to the other manifold devices. However, there is no need to apply the present invention to the manifold device for fuel gas since the lateral diffusion of the fuel gas can be neglected in narrow manifold devices. The number of inlet pipes 9 may vary with height of the fuel cell stack.

What I claim is:

1. A manifold device for a fuel cell system, comprising a body shell having at least one process gas inlet opening, a closure plate having a protrusive portion and being mounted on the shell to form a manifold box, and a distribution unit arranged in the shell to partition an interior space of the shell into the first and second chambers, said protrusive portion of the closure plate being provided with slit-like blowholes to supply process gas to a fuel cell stack, said distribution unit comprising a pair of partitioning members and a partitioning plate mounted thereon in a spaced relationship to form slit-like gaps between them, the first chamber being connected to a process gas inlet pipe through said opening, the second chamber being connected to the first chamber through the slit-like gaps, said partitioning plate being provided with a distributor and a deflector, said distributor having a mountain-shaped cross section and being positioned in front of the opening so as to divide the gas flow from the opening into an upward flow and an downward flow, said deflector being mounted on the exterior surface of partitioning plate and extending vertically in parallel to a center line of the protrusive portion to allow the process gas to converge to the protrusive portion of the closure plate.

2. The manifold device according to claim 1 wherein the partitioning members, together with the partitioning plate, form the first diffusion chamber having a cross section in the shape of an unfolded fan, and wherein the partitioning plate is slightly bent at its both sides in the direction facing to the shell.

3. The manifold device according to claim 1 wherein the slit-like blowholes are provided in the top and side walls of the protrusive portion.

* * * * *